May 27, 1924.                                       1,495,183
G. E. HULSE
BEARING CONSTRUCTION FOR MOTORS
Filed July 13, 1921
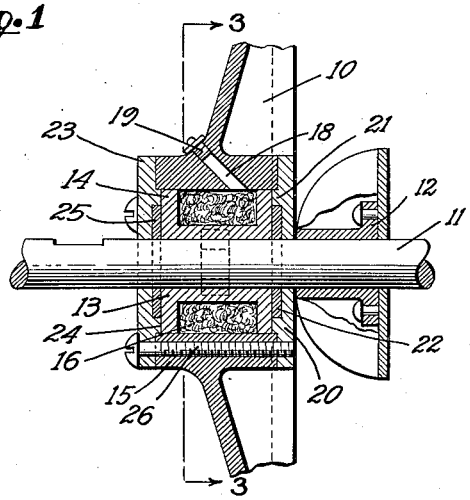
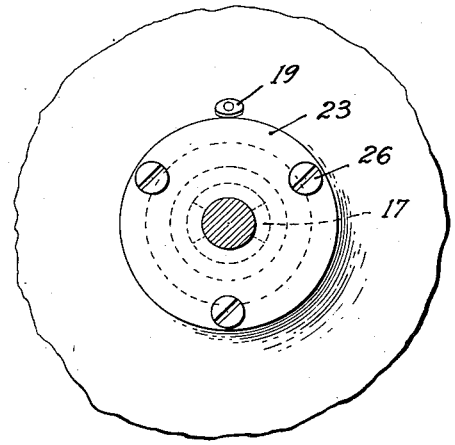
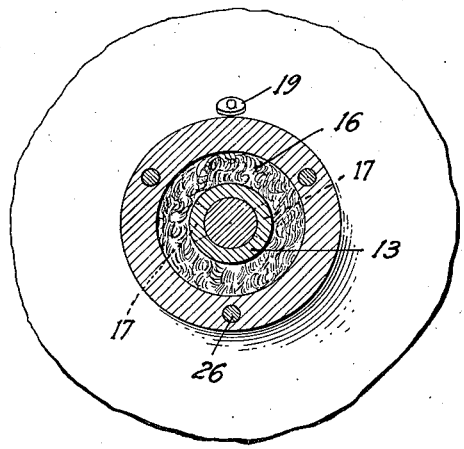
Inventor
George E. Hulse
By his Attorneys Patented May 27, 1924.

1,495,183

UNITED STATES PATENT OFFICE.

GEORGE E. HULSE, OF NEW HAVEN, CONNECTICUT, ASSIGNOR TO THE SAFETY CAR HEATING & LIGHTING COMPANY, A CORPORATION OF NEW JERSEY.

BEARING CONSTRUCTION FOR MOTORS.

Application filed July 13, 1921. Serial No. 484,296.

*To all whom it may concern:*

Be it known that I, GEORGE E. HULSE, a citizen of the United States, and a resident of New Haven, in the county of New Haven and State of Connecticut, have invented an Improvement in Bearing Constructions for Motors, of which the following is a specification.

This invention relates to bearing construction for electric motors and the like.

One of the objects thereof is to provide a simple and practical construction of the above nature in which the parts are compactly disposed and efficient in action. Other objects are to provide a construction of the above nature which will withstand hard conditions of use, require little attention, be inexpensive to manufacture and readily assembled and taken apart. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawing in which is shown one of various possible embodiments of this invention, Figure 1 is a vertical sectional elevation through the bearing and associated parts;

Figure 2 is an end view thereof; and

Figure 3 is a vertical section along the line 3—3 of Figure 1.

Similar reference characters refer to similar parts throughout the several views of the drawing.

Referring now to Figure 1 of the drawing, there is shown at 10 the head of an electric motor casing, the armature shaft being included at 11 and the end of the armature at 12.

The shaft 11 rests within a flanged bushing 13 of a spool-like form, the end flanges 14 thereof fitting snugly within the annular flange 15 at the center of the motor head. Between these flanges the annular cavity or groove is filled with a fibrous packing 16 of waste or the like which serves as a reservoir for oil or other lubricant. This material enters the openings 17 formed through the central sleeve-like portion of the member 13 and rests against the shaft 11 thus serving to feed lubricant to the shaft as the bearing requires lubrication.

An inclined passageway 18 leads through the head to supply lubricant to the material 16 and is closed in the usual way as by the member 19.

The bearing member rests at its inner end against the plate 20 which is provided with an annular shoulder 21 fitting within the flange 15 and with a recess for a felt washer 22 by which the possibility of the lubricant creeping along the shaft is done away with. At the outer end there is provided a removable cap 23 having on its inner surface a shoulder 24 fitting within the flange 15 in a manner similar to the corresponding part 21 at the inner end of the bearing. Also the outer cap member is provided with a recess in which rests a felt washer 25 by which escape of the lubricant is prevented.

The parts are held in assembled relation by the screws 26 passing through the outer portions of the cap 23 and the inner part 20 and anchoring them with respect to the motor head by passing longitudinally through the flange 15.

In the action of the device a suitable amount of lubricant is supplied through the passage 18 so as to maintain the packing 16 in saturated condition. The latter feeds this lubricant direct to the shaft in a reliable manner without the chance of becoming fouled as might happen with the wick type of feed.

Also a large amount of lubricant is held absorbed by this packing without leaving lubricant in liquid form with a consequent tendency to leakage. The escape of lubricant in either direction on the shaft is prevented by the felt washers. When it is desired to remove the bearing, the screws 16 are withdrawn, whereupon the entire device may be drawn endwise out of the motor head and if desired another bearing substituted or the packing renewed.

There is thus provided a simple type of bearing in which the several objects of this invention are achieved. It may readily be adapted to be substituted in motors of ordinary construction for bearings of other types, and is conveniently and quickly removed or re-assembled as hereinbefore explained.

As various possible embodiments might be made of the above invention and as various changes might be made in the embodiment above set forth, it is to be understood that all matter herein set forth or shown in the accompanying drawing is to be interpreted as illustrative and not in a limiting sense.

I claim as my invention:

1. In bearing construction for motors and the like, in combination, a motor head having an annular portion, an armature shaft passing therethrough, a flanged bearing fitted between said shaft and said portion and removable in an endwise direction, an annular outer end piece at each end of said bearing for holding said bearing in position, and means separate from said flanged bearing for removably securing said annular end pieces to said annular portion of said head.

2. In bearing construction for motors and the like, in combination, a supporting member, a shaft passing through said supporting member, a flanged bearing having a sleeve portion fitting said shaft and a pair of spaced flanges resting against said supporting member, said sleeve portion having an opening passing therethrough to said shaft, a filling of fibrous material within the annular space formed between said flanges and said supporting member, and clamping means associated with said bearing and adapted to engage the respective ends of said supporting member to hold said bearing against removal.

3. In bearing construction for motors and the like, in combination, a stationary supporting member, a shaft passing through said supporting member, a bearing comprising a sleeve portion resting against said shaft and a flange resting against said support and forming with said supporting member a reservoir for lubricant about said sleeve portion, a filling of fibrous material within said reservoir, said sleeve portion being provided with an opening leading to said shaft through which said fibrous material projects, said bearing being removable in an endwise direction with respect to said shaft, a pair of annular plate members one at each end of said bearing and each abutting against one end of said stationary supporting member, and a single means adapted to pass through an aperture in said stationary supporting member for clamping said plate members thereto.

4. In bearing construction for motors and the like, in combination, a motor head having an annular portion, an armature shaft passing therethrough, a flanged bearing fitted between said shaft and said portion and removable in an endwise direction, an annular outer end piece having an annular shoulder adapted to fit within said annular portion and adapted for holding said bearing in position and removably secured to said head, said bearing comprising a sleeve portion fitting said shaft and perforated to permit the access of lubricant to said shaft, and lubricant-retaining means inserted between said bearing, said annular outer end piece and said annular shoulder thereon and a pair of flanges contacting said annular portion of said head and forming an annular reservoir for lubricant.

5. In bearing construction for motors and the like, in combination, a motor head comprising an annular portion, an armature shaft passing through said annular portion, a bearing removably fitted between said annular portion and said shaft, an inner member fitting said shaft and holding said bearing against endwise movement in an inward direction, an outer member fitting said shaft and holding said bearing against endwise movement in an outward direction, each of said inner and outer members being recessed upon its face adjacent said bearing, lubricant-retaining means interposed between said bearing and said respective members and within the recessed portions thereof, and means removably holding said outer member in position against the annular portion of said head.

6. In bearing construction for motors and the like, in combination, a motor head comprising an annular portion, an armature shaft passing through said annular portion, a bearing removably fitted between said annular portion and said shaft, an inner member fitting said shaft and holding said bearing against endwise movement in an inward direction, an outer member fitting said shaft and holding said bearing against endwise movement in an outward direction, means in connection with said inner member for removably holding said outer member in position against the annular portion of said head, said bearing comprising a sleevelike portion fitting the shaft and having an opening extending through to the shaft and a pair of flanges spaced one from another and extending outwardly to said annular portion of the head and forming therebetween an annular space for lubricant.

In testimony whereof, I have signed my name to this specification this 2nd day of July, 1921.

GEORGE E. HULSE.